United States Patent
Stachowiak

(10) Patent No.: US 10,514,107 B2
(45) Date of Patent: Dec. 24, 2019

(54) CHECK VALVE FOR OVERFLOW OIL LINE WHEN PRESSURE FILL FITTINGS ARE REMOTE

(71) Applicant: United Technologies Corporation, Farmington, CT (US)

(72) Inventor: David Allen Stachowiak, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 320 days.

(21) Appl. No.: 15/620,180

(22) Filed: Jun. 12, 2017

(65) Prior Publication Data

US 2018/0355987 A1 Dec. 13, 2018

(51) Int. Cl.
| | |
|---|---|
| *F16K 17/20* | (2006.01) |
| *F16K 15/04* | (2006.01) |
| *F16K 15/02* | (2006.01) |
| *F16K 31/20* | (2006.01) |
| *G05D 9/02* | (2006.01) |
| *F01D 25/18* | (2006.01) |

(52) U.S. Cl.
CPC .............. *F16K 17/20* (2013.01); *F01D 25/18* (2013.01); *F16K 15/021* (2013.01); *F16K 15/044* (2013.01); *F16K 31/20* (2013.01); *G05D 9/02* (2013.01)

(58) Field of Classification Search
CPC ...... F16K 17/20; F16K 15/021; F16K 15/044; F16K 31/20; F01D 25/18; G05D 9/02
See application file for complete search history.

(56) References Cited

U.S. PATENT DOCUMENTS

| | | | | |
|---|---|---|---|---|
| 3,821,962 | A * | 7/1974 | Mott | E21B 34/08 137/12 |
| 4,522,229 | A * | 6/1985 | Van de Moortele | E03C 1/106 137/460 |
| 4,945,947 | A | 8/1990 | Westra et al. | |
| 5,046,306 | A * | 9/1991 | Borre, Jr. | F01D 25/18 184/6.11 |
| 8,651,239 | B2 * | 2/2014 | Aida | F16H 57/0408 184/6.12 |
| 8,820,479 | B2 * | 9/2014 | Saenz De Ugarte Sevilla | F03D 80/70 184/6.12 |

(Continued)

FOREIGN PATENT DOCUMENTS

| | | |
|---|---|---|
| CN | 201301688 Y | 9/2009 |
| EP | 0033010 A1 | 8/1981 |

(Continued)

*Primary Examiner* — Michael A Riegelman
(74) *Attorney, Agent, or Firm* — Kinney & Lange, P.A.

(57) ABSTRACT

An oil tank for a gas turbine engine includes a top and a bottom disposed vertically beneath the top. An overfill return passage extends from the bottom of the oil tank toward the top of the oil tank. An outlet is formed on the bottom of the oil tank and inside the overfill return passage. A check valve is inside the overfill return passage and is connected to the outlet. The check valve includes a seat circumscribing the outlet and a plug inside the overfill return passage. The plug has a lower density than an oil disposed inside the oil tank. The check valve does not include a spring such that the plug is configured to translate freely inside the overfill return passage.

18 Claims, 3 Drawing Sheets

(56) References Cited

U.S. PATENT DOCUMENTS

| | | | |
|---|---|---|---|
| 2008/0115843 A1* | 5/2008 | Wang | F16K 15/021 137/533.17 |
| 2008/0237514 A1* | 10/2008 | Yonezawa | F15B 11/0445 251/121 |
| 2012/0247874 A1* | 10/2012 | Poster | F16H 57/027 184/6.12 |
| 2014/0150400 A1 | 6/2014 | Xu | |
| 2016/0290194 A1 | 10/2016 | Parikh et al. | |
| 2018/0355987 A1* | 12/2018 | Stachowiak | F16K 17/20 |

FOREIGN PATENT DOCUMENTS

| | | |
|---|---|---|
| FR | 2633007 A1 | 12/1989 |
| GB | 720222 A | 12/1954 |
| GB | 1273543 A | 5/1972 |
| GB | 2001394 A | 1/1979 |

* cited by examiner

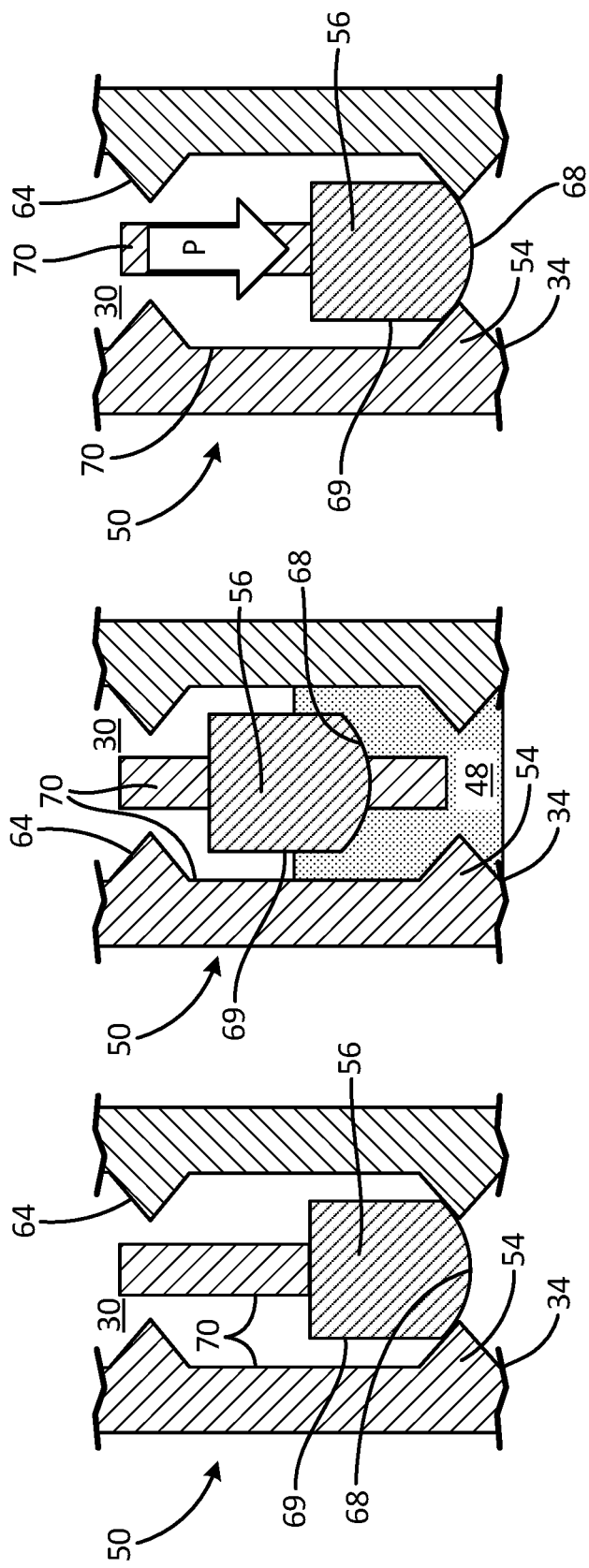

CHECK VALVE FOR OVERFLOW OIL LINE WHEN PRESSURE FILL FITTINGS ARE REMOTE

BACKGROUND

The present disclosure relates to lubrication oil tanks for gas turbine engines used in aircraft.

An oil tank for a gas turbine engine is generally serviced and filled by a ground cart equipped with a pressure fill system and/or manually with cans of oil. In some aircraft, the oil tank is mounted on the turbine engine where the ground cart cannot easily access and refill the oil tank. In this situation, the oil tank on the turbine engine is plumbed to a fill fitting and an overfill fitting on the bulkhead of the aircraft where access is easier for the ground cart.

During a servicing event, the pressure fill system of the ground cart is connected to both the fill fitting and the overfill fitting on the bulkhead. The fill fitting generally includes a check valve that is automatically opened as the pressure fill system directs pressurized oil into the fill fitting. The overfill fitting generally includes a mechanical valve that is opened by the act of connecting the pressure fill system to the overflow fitting. With the valves open, the pressure fill system of the ground cart sends pressurized oil to the oil tank. Overfilling the oil tank can cause harm to the working parts of the turbine engine. To prevent the oil tank from overfilling, excess oil inside the oil tank is returned to the pressure fill system via the overfill fitting.

After the oil tank is filled, the pressure fill system is disconnected from the fill fitting and the overfill fitting. Engine damage or failure can also result should either of the valves in the fill fitting or the overfill fitting fail during engine operation. In the case where the fill and overfill fittings are mounted to the bulkhead of the aircraft, engine damage or failure can also occur should the plumbing to the engine fail and leak oil during operation.

SUMMARY

In one embodiment, an oil tank for a gas turbine engine includes a top and a bottom disposed vertically beneath the top. An overfill return passage extends from the bottom of the oil tank toward the top of the oil tank. An outlet is formed on the bottom of the oil tank and inside the overfill return passage. A check valve is disposed inside the overfill return passage and is connected to the outlet. The check valve includes a seat circumscribing the outlet and a plug inside the overfill return passage. The plug has a lower density than an oil disposed inside the oil tank. A plug retainer is disposed inside the overfill return passage and is positioned vertically between the plug and the top of the oil tank. Together, the plug retainer and the seat trap the plug inside the overfill return passage. The check valve does not include a spring such that the plug is configured to translate freely between the seat and the plug retainer.

In another embodiment, a method for filling an oil tank in a gas turbine engine includes the step of directing oil flow into a spring-loaded check valve connected to an inlet of the oil tank such that the oil flow compresses a spring of the spring-loaded check valve to allow the oil flow to enter the oil tank. The oil tank then fills with oil such that the oil reaches and flows over a top edge of an overfill return passage that extends from a bottom of the oil tank toward a top of the oil tank. A plug inside the overfill return passage then floats on the oil that has flown into the overfill return passage. The oil that has flown into the overfill return passage then drains through an outlet formed in the bottom of the tank inside the overfill return passage.

In another embodiment, an oil tank for a gas turbine engine includes a top and a bottom disposed vertically beneath the top. An overfill return passage extends from the bottom of the oil tank toward the top of the oil tank. An outlet is formed on the bottom of the oil tank and inside the overfill return passage. A check valve is inside the overfill return passage and is connected to the outlet. The check valve includes a seat circumscribing the outlet and a plug inside the overfill return passage. The plug has a lower density than an oil disposed inside the oil tank. The check valve does not include a spring such that the plug is configured to translate freely inside the overfill return passage.

Persons of ordinary skill in the art will recognize that other aspects and embodiments are possible in view of the entirety of the present disclosure, including the accompanying figures.

BRIEF DESCRIPTION OF THE DRAWINGS

FIG. 3A is a schematic view of another embodiment of the check valve on the outlet of the oil tank.

FIG. 3B is a schematic view of the check valve of FIG. 3A in a servicing position.

FIG. 3C is a schematic view of the check valve of FIG. 3A in an operating position.

Figure 1:
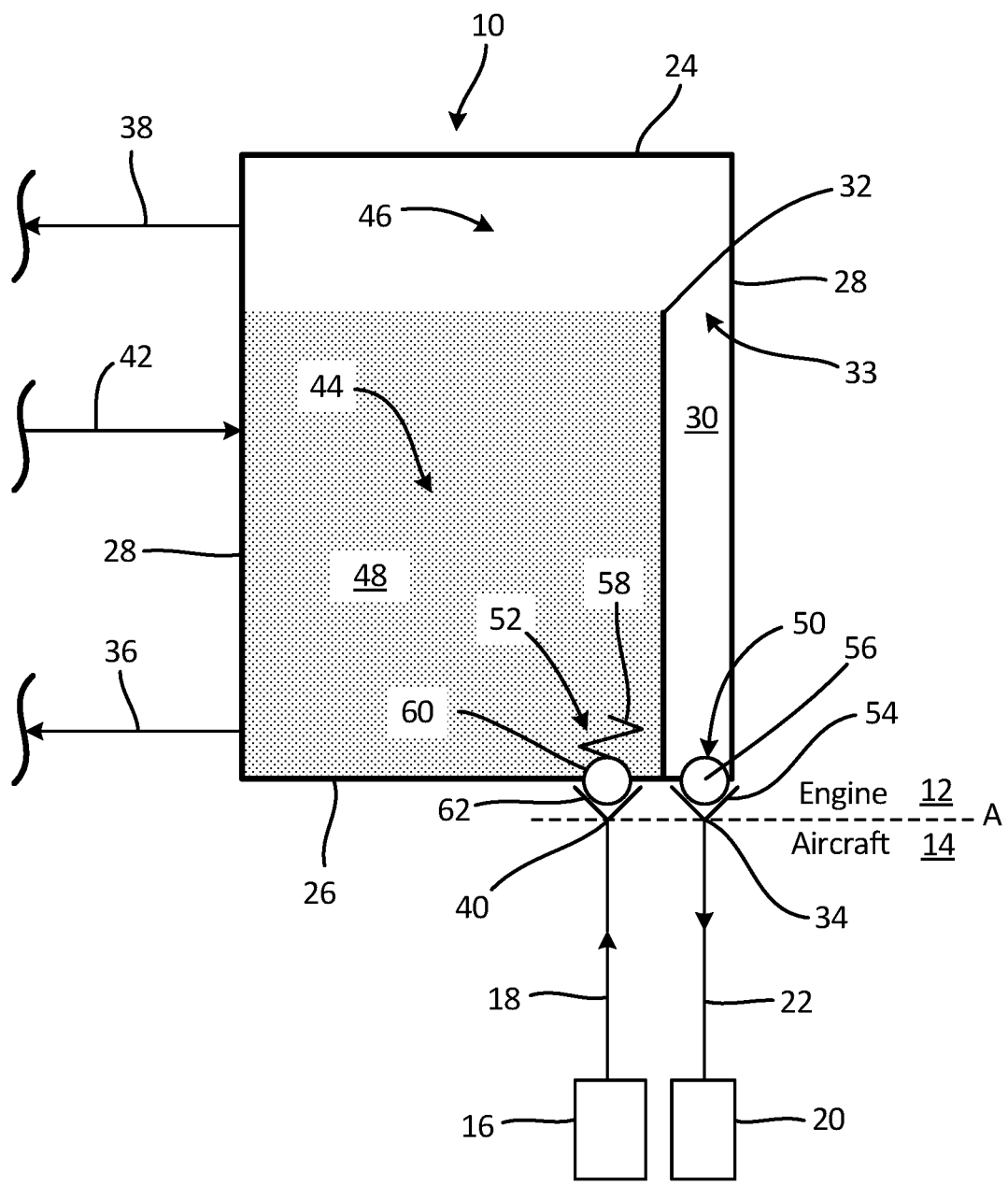
FIG. 1 is a schematic diagram of an oil tank of a gas turbine engine on an aircraft.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to an oil tank for a turbine engine. The oil tank includes an overfill passage, an outlet formed on the bottom of the oil tank inside the overfill passage, and a first check valve inside the overfill passage. The first check valve is spring-less and includes a plug that is less dense than oil. The interior of the oil tank is pressurized during operation, which keeps the plug of the first check valve seated and closed over the outlet. During service events of the turbine engine, the oil tank is depressurized and refilled with oil. Overfilling of the oil tank does not occur during the service event because excess oil inside the oil tank flows into the overfill passage and buoyantly lifts the plug off of the seat, thereby allowing excess oil to exit the oil tank via the outlet. After the oil tank is filled, the oil tank is re-pressurized, forcing the plug of the first check valve back into place over the outlet. Because the plug in the first check valve floats and opens the outlet of the oil tank automatically when the oil tank is depressurized, the first check valve of the oil tank self opens during service events. Furthermore, the first check valve also automatically closes when the oil tank is re-pressurized, thereby reducing the accidental leakage risk of the oil tank. The oil tank and the first check valve are described below with reference to FIGS. 1-3C.

FIG. 1 is a schematic diagram of oil tank 10 on gas turbine engine 12. Gas turbine engine 12 is mounted to aircraft 14. The boundaries of gas turbine engine 12 and aircraft 14 are represented in FIG. 1 by dashed line A, thereby showing which components are on gas turbine engine 12 and which components are located elsewhere on aircraft 14. As shown in FIG. 1, aircraft 14 also includes fill fitting 16, fill line 18, overfill return fitting 20, and overfill return line 22. Oil tank 10 includes top wall 24, bottom wall 26, at least one side wall 28, overfill return passage 30 with top edge 32, first outlet 34, second outlet 36, third outlet 38, first inlet 40, second inlet 42, oil reservoir 44, upper portion 46, oil 48, first check valve 50, and second check valve 52. First check valve 50 includes seat 54 and plug 56. Second check valve 52 further includes spring 58, ball 60, and seat 62.

Bottom wall 26 of oil tank 10 is disposed vertically beneath top wall 24 of oil tank 10 with reference to gravitational ground. Side wall 28 extends from top wall 24 to bottom wall 26 to enclose oil tank 10. In other embodiments, oil tank 10 can include multiple side walls 28 to vary and adapt a geometric shape of oil tank 10. Overfill return passage 30 extends from bottom wall 26 of the oil tank 10 toward top wall 24 of oil tank 10. Overfill return passage 30 does not extend completely to top wall 24, thereby creating top edge 32 and passage opening 33 of overfill return passage 30. As shown in FIG. 1, passage opening 33 and top edge 32 of overfill return passage 30 are positioned vertically between top wall 24 and bottom wall 26 with reference to gravitational ground. Oil reservoir 44 is formed by the portion of the interior of oil tank 10 disposed outside of overfill return passage 30 and between bottom wall 26 and top edge 32 of overfill return passage 30. Oil reservoir 44 houses oil 48 inside oil tank 10. Upper portion 46 of oil tank 10 is disposed vertically between top wall 24 and top edge 32 and is filled with air.

First inlet 40 is formed in bottom wall 26 of oil tank 10 and outside of overfill return passage 30. In other embodiments, first inlet 40 can be formed in side wall 28 proximate bottom wall 26 of oil tank 10 outside of overfill return passage 30. First inlet 40 is connected to fill fitting 16 by fill line 18 and is used to refill oil tank 10 with oil 48 during service events when aircraft 14 is on the ground. As shown in FIG. 1, fill fitting 16 is positioned on aircraft 14 remote from gas turbine engine 12 and oil tank 10. Fill fitting 16 can be positioned on a bulkhead (not shown) of aircraft 14 where fill fitting 16 is easier to access. Fill fitting 16 can include a valve (not shown) that is opened while oil tank 10 is being filled with oil 48 during the service event, and closed after oil tank 10 is filled.

First outlet 34 is formed on bottom wall 26 of oil tank 10 and inside overfill return passage 30. In alternative embodiments, overfill return passage 30 can extend beneath bottom wall 26 and first outlet 34 can be formed in the bottom of overfill return passage 30. First outlet 34 is connected to overfill return fitting 20 by overfill return line 22. During service events, when aircraft 14 is on the ground, overfill return passage 10, overfill return line 22, and overfill return fitting 22 are used to return excess oil 48 (i.e., oil 48 that exceeds the volume of oil reservoir 44) to a filling system, thereby preventing accidental overfill of oil tank 10. Similar to fill fitting 16, overfill return fitting 20 is positioned on aircraft 14 remote from oil tank 10. Overfill return fitting 20 can be positioned on a bulkhead (not shown) of aircraft 14 where overfill return fitting 20 is easier to access. Overfill return fitting 22 can include a mechanical valve (not shown), that is opened before refilling oil tank 10, and closed when refilling of oil tank 10 is complete.

Second outlet 36 is formed in bottom wall 26 of oil tank 10 outside of overfill return passage 30. In alternative embodiments, second outlet 36 can be formed on side wall 28 of oil tank 10 near bottom wall 26 and outside of overfill return passage 30. Second outlet 36 directs oil 48 out of oil tank 10 and to gas turbine engine 12 for lubrication and cooling of critical engine systems and components, such as bearing assemblies and gear assemblies (not shown).

Third outlet 38 is formed on side wall 28 of oil tank 10 within upper portion 46 of oil tank 10 vertically above top edge 32 of overfill return passage 30. Third outlet 38 is an air outlet that directs air from upper portion 46 of oil tank 10 to accessories (not shown) of gas turbine engine 12.

As shown in FIG. 1, second inlet 42 is formed on side wall 28 of oil tank 10 outside of overfill return passage 30. Second inlet 42 returns oil 48 to oil reservoir 44 of oil tank 10 from gas turbine engine 12. Second inlet 42 can also return air to oil tank 10 (the air being mixed with oil 48). The air separates out of oil 48 inside oil tank 10 and returns to upper portion 46 of oil tank 10.

Second check valve 52 is connected to first inlet 40 and is configured to allow oil 48 to flow into oil tank 10 via first inlet 40 without backflow. Second check valve 52 includes spring 58, ball 60 and seat 62. Seat 62 circumscribes first inlet 40 and spring 58 biases ball 60 against seat 62 and first inlet 40 to block first inlet 40 against backflow of oil 48 through first inlet 40.

First check valve 50 is disposed inside overfill return passage 30 and is connected fluidically to first outlet 34. Plug 56 of first check valve 50 rests on seat 54 when first check valve 50 is in a closed position. The density of plug 56 of first check valve 50 is less than the density of oil 48 so that plug 56 floats in oil 48 when oil 48 enters overfill return passage 30 during the service event. Oil tank 10 is pressurized during operation of gas turbine engine 12, which forces plug 56 against seat 54 to close first check valve 50 and seal first outlet 34 against oil leakage. With plug 56 pressed against seat 54 by the internal pressure of oil tank 10, plug 56 does not shift or move off of seat 54 as oil tank 10, gas turbine engine 12, and aircraft 14 shift and maneuver relative to gravitational ground. The operation of first check valve 50 and oil tank 10 is further described below with reference to FIGS. 2A-2C and continued reference to FIG. 1.

Figure 2C:
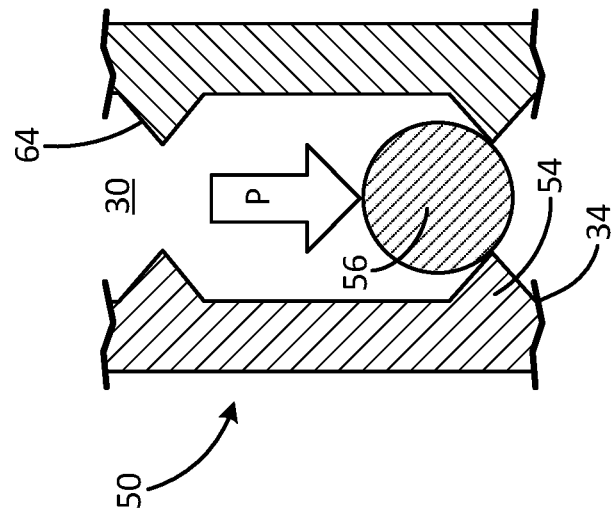
FIG. 2C is a schematic view of the check valve of FIG. 2A in an operating position.
Figure 2B:
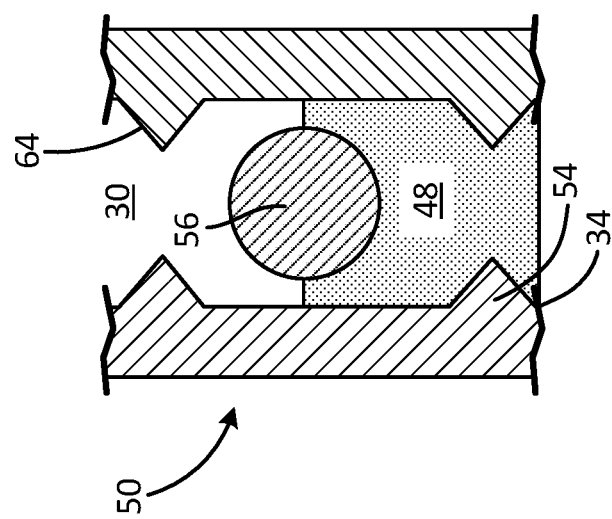
FIG. 2B is a schematic view of the check valve of FIG. 2A in a servicing position.
Figure 2A:
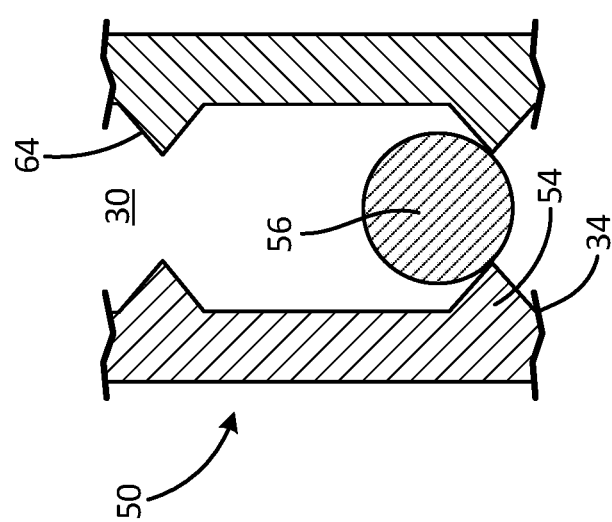
FIG. 2A is a schematic view of a check valve on an outlet of the oil tank in a resting position.

FIG. 2A is a schematic view of first check valve 50 from FIG. 1 in a resting and non-pressurized position just prior to a service event. Oil tank 10 is depressurized when aircraft 14 is on the ground, and gas turbine engine 12 is powered down. With aircraft 14 on the ground, plug 56 of first check 50 rests on seat 54. As shown in FIGS. 2A-2C, seat 54 circumscribes first outlet 34.

FIG. 2B is a schematic view of first check valve 50 of FIG. 2A draining excess oil 48. After oil tank 10 is depressurized, oil tank 10 is refilled by connecting an oil servicing pump (not shown) to fill fitting 16, opening the valves in fill fitting 16 and overfill return fitting 20 on aircraft 14, and activating the oil servicing pump. The oil servicing pump then directs oil flow into spring-loaded second check valve 52 connected to first inlet 40 of oil tank 10 with sufficient pressure that the oil flow compresses spring 58 of second check valve 52 to allow the oil flow to enter oil tank 10. The oil flow then proceeds to fill oil tank 10 with oil 48 such that oil 48 reaches and flows over top edge 32 of overfill return passage 30 and into overfill return passage 30. As oil 48 enters into overfill return passage 30, plug 56 of first check valve 50 floats on oil 48 that has entered overfill return passage 30. With plug 56 floating on oil 48 inside overfill return passage 30, excess oil 48 that has flown into the overfill return passage 30 is able to drain through first outlet 34 and return to the proximity of the oil servicing pump via overfill return line 22 and overfill return fitting 20.

As shown best in FIG. 2B, first check valve 50 includes plug retainer 64 inside overfill return passage 30 and positioned vertically between plug 56 and top wall 24 of oil tank 10. Plug retainer 64 chokes overfill return passage 30 above plug 56 sufficiently to prevent plug 56 from floating or falling out of overfill return passage 30. Plug retainer 64 and seat 54 effectively trap plug 56 inside overfill return passage 30. Plug retainer 64 can be a snap ring, an insert or any other component that chokes overfill return passage 30. Because first check valve 50 does not include a spring, and because plug 56 is less dense than oil 48, plug 56 is able to float and translate freely inside overfill return passage 30 between seat 54 and plug retainer 64. In the embodiment of FIGS. 2A-2C, plug 56 is a hollow metal ball. Plug 56 can also be made from any other material that will make plug 56 less dense and lighter than oil 48 while giving plug 56 the thermal and structural properties necessary to function within oil tank 10 on gas turbine engine 12.

FIG. 2C is a schematic view of first check valve 50 of FIG. 2A in a closed and sealed position after oil tank 10 is pressurized. After oil reservoir 44 of oil tank 10 is filled with oil 48, and excess oil 48 drained out through first check valve 50 and first outlet 34, oil tank 10 is re-pressurized (represented by arrow P), which forces plug 56 against seat 54 to close first check valve 50 and seal first outlet 34 against oil leakage. The valves (not shown) in fill fitting 16 and overfill return fitting 20 are also closed.

FIGS. 3A-3C disclose another embodiment of first check valve 50 and plug 56. As shown in FIGS. 3A-3C, plug 56 can be a hollow bullet with rounded mate face 68 connected to cylindrical body 69. Rounded mate face 68 corresponds with a sealing face of seat 54 of first check valve 50. Similar to the embodiment of FIGS. 2A-2C, bullet-shaped plug 56 of FIGS. 3A-3C is hollow and formed from metal. As shown in FIGS. 3A-3C, guide ribs 70 are disposed inside overfill return passage 30. Each of guide ribs 70 extends between seat 54 and plug retainer 64. Each of guide ribs 70 is spaced from one another along a circumference of overfill return passage 30 and around plug 56 so as to allow oil 48 to cross first check valve 50 between guide ribs 70. Guide ribs 70 are sized relative plug 56 so as to allow plug 56 to translate between seat 54 and plug retainer 64 while keeping rounded mate face 68 of plug 56 continually oriented toward seat 54.

In view of the foregoing description, it will be recognized that the present disclosure provides numerous advantages and benefits. For example, first check valve 50 and second check valve 52 will keep oil tank 10 sealed and pressurized in the event that fill fitting 16, fill line 18, overfill return fitting 20, or overfill return line 22 should fail. First check valve 50 and second check valve 52 also actuate automatically with refill and pressurization of oil tank 10, and do not require manual actuation. Furthermore, first check valve 50 and second check valve 52 allow testing of gas turbine engine 12 while apart from aircraft 14 because first check valve 50 and second check valve 52 are capable of sealing and maintaining pressure inside oil tank 10 independent of fill fitting 18 and overfill return fitting 20.

The following are non-exclusive descriptions of possible embodiments of the present invention.

In one embodiment, an oil tank for a gas turbine engine includes a top and a bottom disposed vertically beneath the top. An overfill return passage extends from the bottom of the oil tank toward the top of the oil tank. An outlet is formed on the bottom of the oil tank and inside the overfill return passage. A check valve is disposed inside the overfill return passage and is connected to the outlet. The check valve includes a seat circumscribing the outlet and a plug inside the overfill return passage. The plug has a lower density than an oil disposed inside the oil tank. A plug retainer is disposed inside the overfill return passage and is positioned vertically between the plug and the top of the oil tank. Together, the plug retainer and the seat trap the plug inside the overfill return passage. The check valve does not include a spring such that the plug is configured to translate freely between the seat and the plug retainer.

The oil tank of the preceding paragraph can optionally include, additionally and/or alternatively, any one or more of the following features, configurations and/or additional components:

an inlet formed in the bottom of the oil tank and outside of the overfill return passage;

a second check valve connected to the inlet, wherein the second check valve comprises a ball and a spring configured such that the spring biases the ball against the inlet to block the inlet;

the plug is a hollow metal ball;

the plug is a bullet with a cylindrical body connected to a rounded mate face that corresponds with a sealing face of the seat;

the overfill return passage comprises: a plurality of guide ribs extending between the seat and the plug retainer, wherein each of the plurality of guide ribs are spaced from one another along a circumference of the overfill return passage; and/or the bullet is hollow and is formed from metal.

In another embodiment, a method for filling an oil tank in a gas turbine engine includes the step of directing oil flow into a spring-loaded check valve connected to an inlet of the oil tank such that the oil flow compresses a spring of the spring-loaded check valve to allow the oil flow to enter the oil tank. The oil tank then fills with oil such that the oil reaches and flows over a top edge of an overfill return passage that extends from a bottom of the oil tank toward a top of the oil tank. A plug inside the overfill return passage then floats on the oil that has flown into the overfill return passage. The oil that has flown into the overfill return passage then drains through an outlet formed in the bottom of the tank inside the overfill return passage.

The method of the preceding paragraph can optionally include, additionally and/or alternatively, any one or more of the following features, configurations and/or additional components:

pressurizing the oil tank after the oil in the overfill return passage has drained out of the passage and the plug is resting over the outlet.

In another embodiment, an oil tank for a gas turbine engine includes a top and a bottom disposed vertically beneath the top. An overfill return passage extends from the bottom of the oil tank toward the top of the oil tank. An outlet is formed on the bottom of the oil tank and inside the overfill return passage. A check valve is inside the overfill return passage and is connected to the outlet. The check valve includes a seat circumscribing the outlet and a plug inside the overfill return passage. The plug has a lower density than an oil disposed inside the oil tank. The check valve does not include a spring such that the plug is configured to translate freely inside the overfill return passage.

The oil tank of the preceding paragraph can optionally include, additionally and/or alternatively, any one or more of the following features, configurations and/or additional components:

the overfill return passage comprises: a plug retainer inside the overfill return passage and positioned vertically between the plug and the top of the oil tank, wherein the plug retainer and the seat trap the plug inside the overfill return passage;

an inlet formed proximate the bottom of the oil tank and outside of the overfill return passage;

a second check valve connected to the inlet, wherein the second check valve comprises a ball and a spring configured such that the spring biases the ball against the inlet to block the inlet;

a second outlet formed in the bottom or a side of the oil tank outside of the overfill return passage;

an air outlet formed in the oil tank vertically above a top edge of the overfill return passage;

a second inlet formed on the oil tank outside of the overfill return passage;

the plug retainer comprises an inside diameter smaller than an inside diameter of the overfill return passage;

the plug retainer is a snap ring;

the plug is a hollow metal ball; and/or the plug is a hollow bullet with a cylindrical body connected to a rounded mate face that corresponds with a sealing face of the seat.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An oil tank for a gas turbine engine, wherein the oil tank comprises:
   a top;
   a bottom disposed vertically beneath the top;
   an overfill return passage extending from the bottom of the oil tank toward the top of the oil tank;
   an outlet formed on the bottom of the oil tank and inside the overfill return passage; and
   a check valve inside the overfill return passage and connected to the outlet, wherein the check valve comprises:
      a seat circumscribing the outlet;
      a plug inside the overfill return passage, wherein the plug has a lower density than an oil disposed inside the oil tank; and
      a plug retainer inside the overfill return passage and positioned vertically between the plug and the top of the oil tank, wherein the plug retainer and the seat trap the plug inside the overfill return passage, and
      wherein the check valve does not include a spring such that the plug is configured to translate freely between the seat and the plug retainer.

2. The oil tank of claim 1 further comprising:
   an inlet formed in the bottom of the oil tank and outside of the overfill return passage.

3. The oil tank of claim 2 further comprising:
   a second check valve connected to the inlet, wherein the second check valve comprises a ball and a spring configured such that the spring biases the ball against the inlet to block the inlet.

4. The oil tank of claim 3, wherein the plug is a hollow metal ball.

5. The oil tank of claim 3, wherein the plug is a bullet with a cylindrical body connected to a rounded mate face that corresponds with a sealing face of the seat.

6. The oil tank of claim 5, wherein the overfill return passage comprises:
   a plurality of guide ribs extending between the seat and the plug retainer, wherein each of the plurality of guide ribs are spaced from one another along a circumference of the overfill return passage.

7. The oil tank of claim 6, wherein the bullet is hollow and is formed from metal.

8. An oil tank for a gas turbine engine, wherein the oil tank comprises:
   a top;
   a bottom disposed vertically beneath the top;
   an overfill return passage extending from the bottom of the oil tank toward the top of the oil tank;
   an outlet formed on the bottom of the oil tank and inside the overfill return passage; and
   a check valve inside the overfill return passage and connected to the outlet, wherein the check valve comprises:
      a seat circumscribing the outlet;
      a plug inside the overfill return passage, wherein the plug has a lower density than an oil disposed inside the oil tank; and
      wherein the check valve does not include a spring such that the plug is configured to translate freely inside the overfill return passage.

9. The oil tank of claim 8, wherein the overfill return passage comprises:
   a plug retainer inside the overfill return passage and positioned vertically between the plug and the top of the oil tank, wherein the plug retainer and the seat trap the plug inside the overfill return passage.

10. The oil tank of claim 9 further comprising:
    an inlet formed proximate the bottom of the oil tank and outside of the overfill return passage.

11. The oil tank of claim 10 further comprising:
    a second check valve connected to the inlet, wherein the second check valve comprises a ball and a spring configured such that the spring biases the ball against the inlet to block the inlet.

12. The oil tank of claim 11 further comprising:
a second outlet formed in the bottom or a side of the oil tank outside of the overfill return passage.

13. The oil tank of claim 12 further comprising:
an air outlet formed in the oil tank vertically above a top edge of the overfill return passage.

14. The oil tank of claim 13 further comprising:
a second inlet formed on the oil tank outside of the overfill return passage.

15. The oil tank of claim 9, wherein the plug retainer comprises an inside diameter smaller than an inside diameter of the overfill return passage.

16. The oil tank of claim 15, wherein the plug retainer is a snap ring.

17. The oil tank of claim 8, wherein the plug is a hollow metal ball.

18. The oil tank of claim 8, wherein the plug is a hollow bullet with a cylindrical body connected to a rounded mate face that corresponds with a sealing face of the seat.

* * * * *